June 8, 1937. E. C. DAMROW 2,083,318
CHEESE HOOP
Filed Nov. 28, 1934
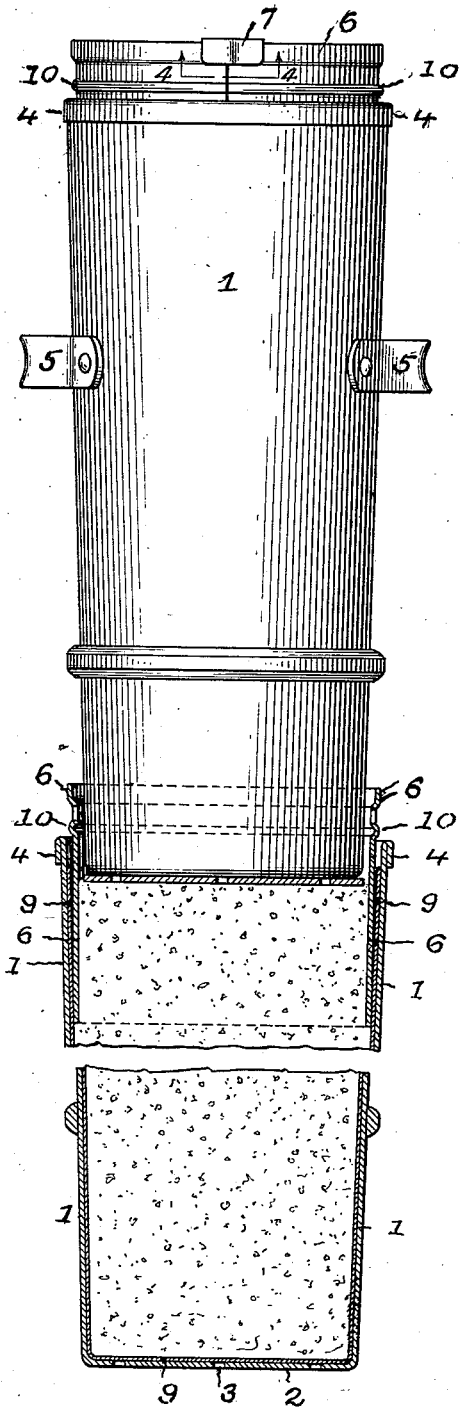
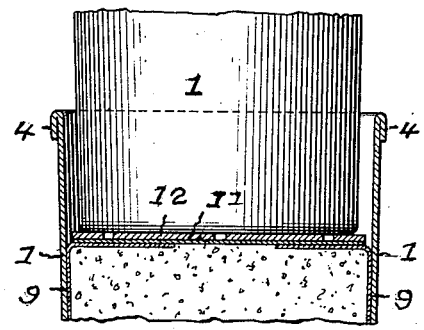
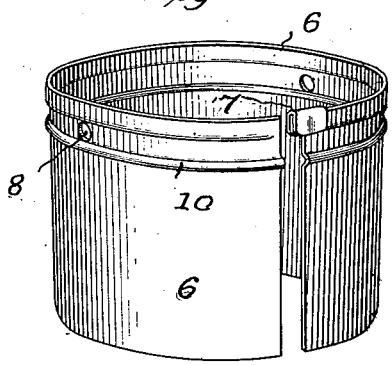
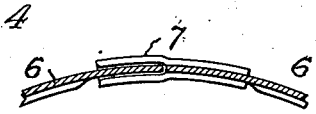
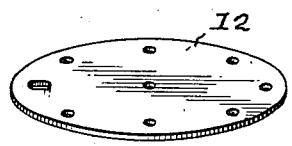
Inventor:
Edward C. Damrow,
By Robert Burns,
Atty.

Patented June 8, 1937

2,083,318

UNITED STATES PATENT OFFICE 2,083,318

CHEESE HOOP

Edward C. Damrow, Fond du Lac, Wis., assignor to Damrow Brothers Company, Fond du Lac, Wis., a corporation of Wisconsin Application November 28, 1934, Serial No. 755,160

1 Claim. (Cl. 100—55.5)

This invention relates to that form of cheese hoops in which a series of hoops are nested during the compression operation, with the bottom head of one hoop forming the pressure head of an adjacent hoop, and more particularly to the type of hoops used in the production of the form or grade of cheese known in commerce as "Longhorn". And this improvement has for its object:

To provide a structural formation and combination of parts in a tapering hoop or mold member and its associated bandage holding bandager sleeve or ring adapted to attain a substantial holding of a bandage or wrapper for the product in proper position without liability to rupture or tearing of the bandage at the holding point, said formation providing in addition a smooth and unbroken inner surface in the tapering hoop or mold member adapted to insure a smooth and even outer surface to the finished product and an avoidance of irregularities in the same, more particularly the objectionable ridge that is formed on the upper end of the product by a cheese hoop of the construction now in general use, due to the offset formation of the wall of the hoop, all as will hereinafter more fully appear.

In the accompanying drawing:—

Fig. 1 is a view illustrating a pair of cheese hoops of this improvement in a nested condition, with the uppermost hoop being shown in elevation and the lowermost hoop shown in section, and with the two hoops shown in their relative position near the beginning of the primary pressure operation on the contents of said lowermost hoop.

Fig. 2 is a detail section showing the relative position of the pair of cheese hoops near the end of the final compression of the contents of the lowermost hoop with the bandager sleeve or ring removed with a follower head of the required diameter inserted between the two cheese hoops.

Fig. 3 is a detail perspective view of the bandager sleeve or ring for the bandage or wrapping of cheese cloth for the finished product.

Fig. 4 is a detail section on line 4—4, Fig. 1, showing the means for securing the edges of the longitudinal slit of the bandager sleeve in proper aligned relation.

Fig. 5 is a detail perspective view of a follower head.

Like reference numerals indicate like parts in the several views.

In this improvement the tapering hoop or mold member 1 usually of circular form, is open at its larger end and provided at its smaller end with a closure head 2, said head preferably constituting an integral part of the hoop, and formed with a series of outlet orifices 3 for the escape of whey during the compressing operation on the contents of the hoop.

In addition the tapering hoop or mold member 1 is provided at its open and larger end with the usual marginal return bend reinforcing flange 4, and at or near its mid-length with handles 5 for convenient handling of the hoop or mold member.

The associated bandager sleeve or ring 6 is of the longitudinally slitted type, with the edges of the slit held in aligned relation at their upper ends by a clip member 7, as shown in Figs. 1, 3 and 4. In this improvement the bandager sleeve or ring 6 is preferably of a tapering formation from one end to the other, with the degree of taper slightly less than the larger taper of the hoop or mold member 1 so that when in position in the hoop member 1 its lower end will be closely adjacent to the inner wall of the member 1 and provide a very effective means for holding in proper position a bandage or wrapper for the finished product.

Near its upper end the bandager sleeve 6 is formed with lateral orifices 8 for convenience in pulling out the sleeve with a hooked tool.

The formation of the hoop or mold member 1 with an unbroken tapering interior in connection with the bandager member 6 of a less tapering formation, is a material part of the present invention, in that in addition to providing an even and effective means whereby the bandage or cheese cloth wrapper 9, by which the contents of the hoop or mold member 1 is enveloped, is clamped and held in an even and substantial manner between the lower end of the bandager sleeve 6 and the tapering inner surface of the interior of the hoop or mold member 1, also permits of the formation of the inner surface of the wall of said hoop or mold member of a smooth and even nature from end to end, so that when the contents is compressed it will have a like smooth and even external formation with an entire avoidance of objectionable ridges and like imperfections in the finished product due to offsets and the like in the inner wall of the cheese hoops of the ordinary form now in general use.

With the above mentioned construction of parts by which the bandage 9 is held in place, an undue movement of the bandager sleeve 6 into the hoop or mold member 1, either accidental or otherwise, would cause an excessive wedging or binding of the lower edge of said bandager sleeve in the tapering interior of the hoop or mold member 1 and render a subsequent manual separation of the parts a difficult operation.

The prevention of the above mentioned wedging or binding of parts is a necessary requirement and to such end the bandager sleeve 6 is provided with a fixed stop collar 10 on its perimeter adjacent to the mid-length of the same. Said collar being adapted to contact with the rim or margin of the open end of the hoop or mold member 1 to prevent any further excessive movement between the parts.

While the drawing illustrates the invention applied to the round form of cheese hoops or molds, it is equally applicable to the ordinary rectangular form of cheese hoops also in general use.

In the operation of this invention, the bandage 9 will extend up to near the open top of the hoop or mold member 1, and after the preliminary compression of the contained curd material has been effected with the top of the curd then about level with the bottom of the bandager sleeve 6, the bandager sleeve is removed and said material repressed in the usual manner. Before such repressing operation the bandage is folded over the top of said material as illlustrated in Fig. 2, and a small supplementary bandage 11 placed on top of the folded portion of the bandage. An orificed follower plate 12 is then applied on top of said supplementary bandage, after which a plurality of the filled cheese hoops are nested one in the other in the usual manner and submitted to final compression in a cheese press of the continuous compression type.

Having thus fully described my invention what I claim as new, is:—

In a cheese hoop of the type described, the combination of a main hoop body having a plain interior uniformly tapering throughout its length and provided with a closure head at its smaller end, and a bandager sleeve fitting into the upper portion of said main body, said bandager sleeve having a plane taper of less than that of said body where it fits into said body and adapted to hold a bandage in contact with the inner wall of said body and having a stop portion engageable with the top of said body to limit the clamping pressure between the sleeve and body when a bandage is interposed therebetween, the tapers of said sleeve and body providing an extensive clamping contact throughout substantially the length of the portion of the sleeve fitting within the body and of gradually increasing pressure from the upper to the lower end of the sleeve.

EDWARD C. DAMROW.